United States Patent
Raghunath

[11] Patent Number: 5,946,349
[45] Date of Patent: Aug. 31, 1999

[54] METHOD FOR COEFFICIENT SMOOTHING IN ADAPTIVE EQUALIZER SYSTEMS

[75] Inventor: Kalavai Janardhan Raghunath, Chatham, N.J.

[73] Assignee: Lucent Technologies Inc., Murray Hill, N.J.

[21] Appl. No.: 08/841,745

[22] Filed: Apr. 30, 1997

[51] Int. Cl.$^6$ .................................................. H04L 27/01
[52] U.S. Cl. ...................................... 375/232; 364/724.2
[58] Field of Search .................................. 375/232, 230, 375/233, 234, 350; 364/724.011, 724.012, 724.16, 724.17, 724.19, 724.2

[56] References Cited

U.S. PATENT DOCUMENTS 5,251,233  10/1993  Labedz et al. ............................. 375/12

Primary Examiner—Amanda Le

[57] ABSTRACT

A method is described for eliminating the impact on an output of an adaptive equalizer due to the occurrence of "false" coefficients of such an equalizer. In particular, a method is provided for selecting a threshold as representing the smallest expected "ghost" value to be encountered by the filter/equalizer, and thereafter causing coefficients having values less than such threshold to be set to zero.

19 Claims, 2 Drawing Sheets

METHOD FOR COEFFICIENT SMOOTHING IN ADAPTIVE EQUALIZER SYSTEMS

FIELD OF THE INVENTION

This application is related to the art of digital signal processing and more particularly to methods for providing coefficient smoothing in adaptive equalizer systems.

BACKGROUND OF THE INVENTION

In the contemporary information transmission art, information is routinely sent across a transmission medium as a digital signal—i.e., a signal for which both time and amplitude are discrete, whether that information is inherently represented in an analog or digital form. In the case of information which is originally in an analog form, the continuous analog signal is sampled at predetermined intervals to arrive at a sequence of discrete numbers—each being representative of a value of the continuous signal at that sample point. After such a "digitizing" procedure, there is no difference from the standpoint of the transmission infrastructure between such analog-originated information and information which originates in a digital form.

Signal processing of information signals transmitted over a channel occurs in a wide variety of applications and with many objectives. Typical reasons for signal processing include: estimation of characteristic signal parameters; elimination or reduction of unwanted interference; and transformation of a signal into a form that is in some manner more useful or informative. Such processing of discrete (or digital) information signals is carried out by Digital Signal Processing ("DSP") techniques. Applications of DSP techniques currently occur in such diverse fields as acoustics, sonar, radar, geophysics, communications and medicine.

Processing elements which operate on a digital signal frequently occur as filters or equalizers, which are typically represented in the form shown in FIG. 1. There, $x_n$ represents an input signal at a given clock interval, n, delay registers 10 hold values of the input signal for preceding clock intervals, multipliers 11 produce the product of the signal from taps along the input line and coefficients, $C_i$ (i=0, 1, ..., n−1), and those products are added by adders 12 to form the output signal $y_n$. As can be seen in the figure, a characteristic of such a tapped delay line is that an output is a function of an input signal (including, in some cases, prior values of that input signal) and coefficients corresponding to the taps. Algebraically, that relationship would generally be of the form:

$$Y_n = C_0 x_n + C_1 x_{n-1} + C_2 x_{n-2} + \ldots + C_{n-1} x_1$$

where y represents an output signal, x represents an input signal and $C_0, C_1, \ldots C_{n-1}$ are representative of the coefficients.

A comparatively recent variation in digital signal processing is known as adaptive signal processing which has developed concurrently with rapid advances in processing power for DSP hardware devices. A significant difference between classical signal processing techniques and the methods of adaptive signal processing is that the latter are generally applied for time varying digital systems. For the adaptive signal processing case of adaptive filtering, a filter (or equalizer) is caused to adapt to changes in signal statistics so that the output is as close as possible to some desired signal. Adaptive filtering will often be applied for the recovery of an input signal after transmission of that signal over a noisy channel.

Various adaptation algorithms are well known in the art and need not be discussed herein. However, it should be observed that the general adaptation process for an adaptive filter or equalizer operates on the tap coefficients of such a filter or equalizer by iteratively adjusting such coefficients to progress toward the achievement of a desired objective—e.g. a signal to noise ratio above a defined threshold. The general adaptation process can be described algebraically as:

$$C' = C \pm u$$

where C' is the value of coefficient C after an adaptation iteration and u represents an update term added by the adaptation iteration. It should be understood of course that each coefficient in a filter will be updated in this same manner and that the update term u may, and likely will, vary from coefficient to coefficient. In a conventional digital system those coefficient values will be expressed as binary numbers.

In practice, adaptive filters and equalizers typically have a large number of taps and a corresponding large number of coefficients. It is not at all uncommon for such an adaptive filter or equalizer to have on the order of 256 coefficients. A characterization of such adaptive filters/equalizers is that most of the coefficients at any given time are quite small.

To illustrate the reason for this phenomenon, consider an equalizer used to cancel "ghost" signals along a transmission line. Since the designer of the equalizer usually will have no information as to the actual location of such "ghost" signals on the transmission line, the equalizer is designed with taps (and coefficients) covering positions all along the transmission line. Although the equalizer coefficients of interest will appear at the points where actual "ghost" signals occur in the transmission line, and will be of comparatively large magnitude, a large number of small, non-zero coefficients will also be produced by the equalizer due to noise or other random conditions.

Since such small coefficients generally do not correspond to actual transmission line anomalies, the equalizing "correction" which they represent is actually a degradation in the output signal. Processing of such "false" coefficient signals also represents unwanted processor overhead and can, as well, reduce the useful life of processor components.

SUMMARY OF INVENTION

It is accordingly an object of the invention to provide a method for reducing "false" coefficients to zero, and thus eliminate an effect from such false coefficients in the output signal of an adaptive filter/equalizer. To that end, a method is provided for selecting a threshold as representing the smallest expected "ghost" value to be encountered by the filter/equalizer, and thereafter causing coefficients having values less than such threshold to be set to zero. For positive valued coefficients this process can be carried out by truncating a predetermined number of the least significant bits of the coefficient value. In the case of negative valued coefficients, where small values near zero will occur as all "1"s in two's-compliment representation for most bit positions, a means is provided for recognition of such near-zero negative values and setting the value of such coefficients to zero.

DETAILED DESCRIPTION OF INVENTION

Figure 1:
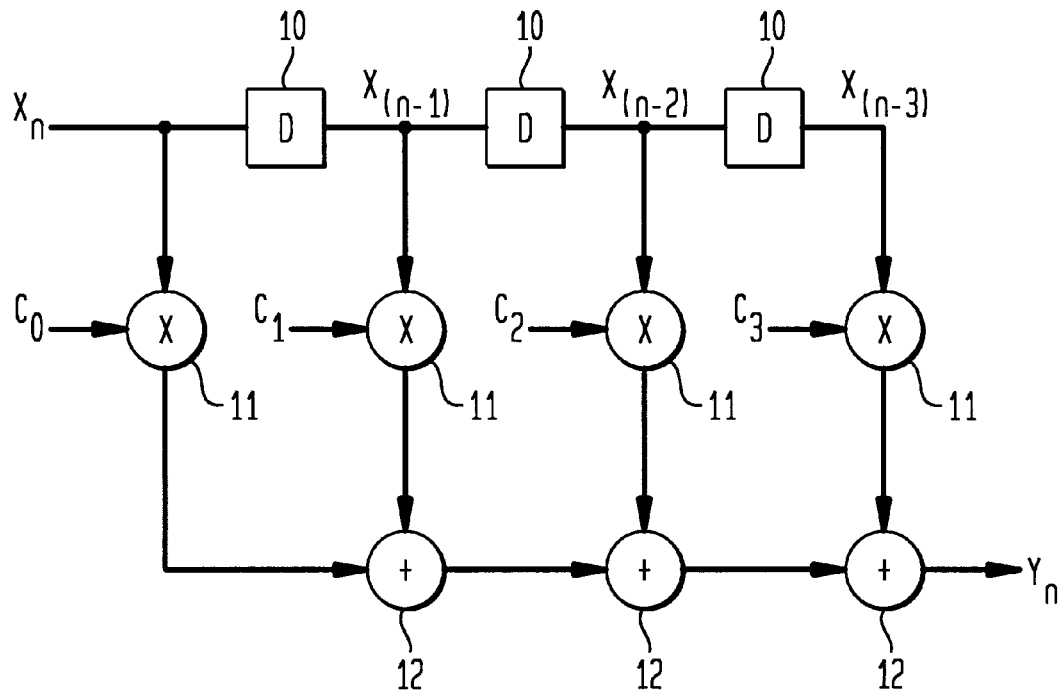
FIG. 1 illustrates in schematic form a typical digital filter/equalizer.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

It is well known in the art of digital signal processing that adaptive filters and adaptive equalizers are functionally equivalent. In an illustrative case, a transmission line may be modeled as an adaptive filter having a given set of filter coefficients, and a signal passing through that channel can be equalized by passing it through another adaptive filter (or equalizer) with coefficients adjusted so that they approximate an inverse filter to the channel filter. For convenience, the method of the invention will generally be described herein in terms of operation on the coefficients of an "equalizer". It should be understood, however, that the term "equalizer" is used herein to characterize any digital device having a staged operation on an input signal and coefficients corresponding to the action of each such stage, and that the methodology of the invention applies to any such device, whether characterized as an equalizer, a filter, a tapped delay line, an echo canceler, or the like.

It is also well known that the processing of digital signal data is commonly carried out using data represented in the binary number system (base 2) using positional notation. Additionally, because of difficulties in machine processing of negative numbers in traditional sign and magnitude format, it has become the norm to use complements of such numbers and including a bit (usually in the most significant bit position) indicative of the sign of the number in question. And, the two's-complement representational form is generally preferred over the one's-complement form. Such binary, two's-complement representation will be used in the discussion following to illustrate the methodology of the invention, and may be considered a part of the preferred embodiment of the invention.

As explained in the Background section, it is desirable to avoid operation by an equalizer on very small coefficients. According to the method of the invention, that goal is realized by choosing a coefficient threshold level, below which no material "ghosts" are expected to be represented, and thereafter causing each coefficient value below that threshold level to be set to zero. More particularly, in a preferred embodiment, and recognizing that coefficient values in that embodiment are represented by positional bits corresponding to increasing (or decreasing) powers of two, a threshold t is chosen such that $2^t$ is the smallest ghost value which the equalizer will be expected to process. Such a value can readily be determined by one skilled in the art of the invention. It should also be apparent that such a threshold can be established for classes of transmission lines, or other transmission media, being equalized, thus permitting automated application of the methodology of the invention.

Before further describing the process by which the method of the invention utilizes the described threshold, it is useful to briefly review the process by which coefficients are updated in an adaptive equalizer. Recall the general update relationship for a given coefficient described in the Background section:

$$C' = C \pm u.$$

Figure 2:
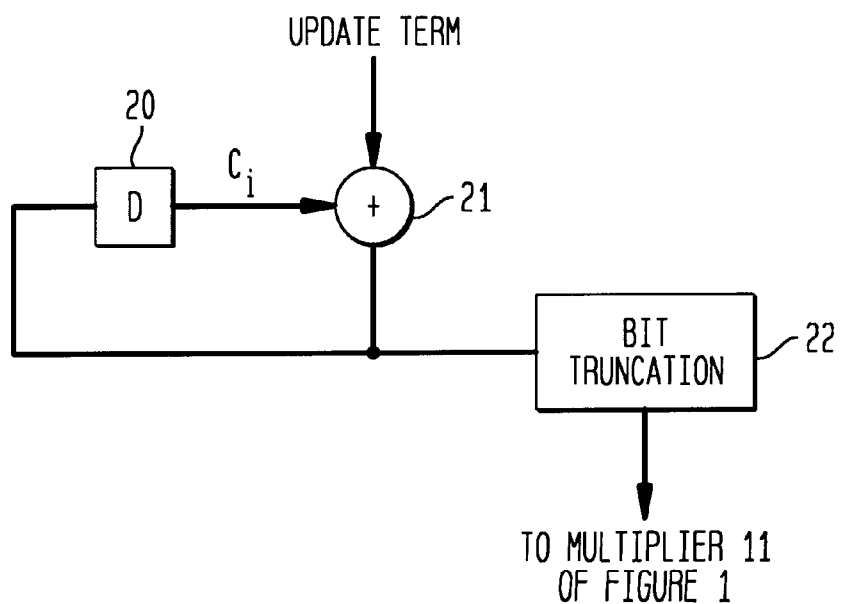
FIG. 2 provides a schematic depiction of the update process for a coefficient of an adaptive filter/equalizer.

As explained there, various well-known adaptation algorithms are available to carry out the coefficient update process and all operate, at a fundamental level, to create an updated coefficient value by adding or subtracting an update term (computed by the adaptation algorithm) to the original coefficient value. This coefficient update process is schematically illustrated in FIG. 2. As can be seen in the figure, a value of a given coefficient, $C_i$, is stored in delay register 20, and an output of that register is sent to an adder 21 where it is summed with the update term to provide the updated (or adapted) value of that coefficient. Such updated coefficient value is then both fed back to delay register 20 (replacing the prior coefficient value in that register) and fed forward to the appropriate multiplier 11 of FIG. 1 (for multiplication with the value of the appropriate tap from the input line of the equalizer). Note, however, that the figure includes an additional function, Bit Truncation 22, which operates on the output of the coefficient update function prior to that output being sent to the input of the appropriate multiplier of the equalizer. Such a Bit Truncation function is commonly utilized in adaptive equalizers because it has been found that the coefficient update function typically needs a larger number of bits to achieve a desired level of accuracy than is needed for the multiplication of that updated coefficient with the value of the appropriate input line tap. Accordingly, since the multiplier typically produces a product with a total bit length equal to the sum of the number of bits in the multiplier and in the multiplicand, and that product must be stored (at least temporarily) in a bit register of the same length, a design decision to truncate the length of this updated coefficient prior to multiplication is often followed.

By applying the "ghost" threshold determined according to the method of the invention in conjunction with this Bit Truncation function, a portion of the "false" coefficients will be eliminated. Application of this process can readily be illustrated with an example. Assume, for purpose of example, that coefficients for an exemplary adaptive equalizer each have 24 bit wordlengths and assume further that it has been determined for the application in which the equalizer is being used, that no "ghost" smaller than $2^8$ needs to be removed by the equalizer. Now consider a small non-zero coefficient having the following positive binary value (for convenience of discussion the bit position for each bit is shown as a subscript of the bit value):

$$0_{24}\, 0_{23}\, 0_{22}\, 0_{21}\, 0_{20}\, 0_{19}\, 0_{18}\, 0_{17}\, 0_{16}\, 0_{15}\, 0_{14}\, 0_{13}\, 0_{12}\, 0_{11}\, 0_{10}\, 0_9\, 0_8 \\ 0_7\, 0_6\, 0_5\, 0_4\, 1_3\, 1_2\, 0_1 \quad (1)$$

By applying Bit Truncation using the selected threshold (or a larger threshold if warranted by other conditions) to this coefficient value, all bits to the right of the 8th bit position would be dropped. As can readily be seen, the truncated value would be:

$$0_{24}\ 0_{23}\ 0_{22}\ 0_{21}\ 0_{20}\ 0_{19}\ 0_{18}\ 0_{17}\ 0_{16}\ 0_{15}\ 0_{14}\ 0_{13}\ 0_{12}\ 0_{11}\ 0_{10}\ 0_9\ 0_8$$

or simply zero. Since any term multiplied by zero is still zero, such bit truncation based on the chosen "ghost" threshold results in an elimination of small positive coefficients from the output of the equalizer.

For small negative numbers, however, the process of the invention is somewhat more complicated. In two's-complement form, a negative value equal in magnitude to the positive number shown at (1) above will appear in the form:

$$1_{24}\ 1_{23}\ 1_{22}\ 1_{21}\ 1_{20}\ 1_{19}\ 1_{18}\ 1_{17}\ 1_{16}\ 1_{15}\ 1_{14}\ 1_{13}\ 1_{12}\ 1_{11}\ 1_{10}\ 1_9\ 1_8$$
$$1_7\ 1_6\ 1_5\ 1_4\ 0_3\ 1_2\ 0_1 \quad (2)$$

Truncation of this value according to the chosen "ghost" threshold (i.e., dropping the 7 least significant bits) yields the result:

$$1_{24}\ 1_{23}\ 1_{22}\ 1_{21}\ 1_{20}\ 1_{19}\ 1_{18}\ 1_{17}\ 1_{16}\ 1_{15}\ 1_{14}\ 1_{13}\ 1_{12}\ 1_{11}\ 1_{10}\ 1_9\ 1_8$$

Because the multiplier assumes that the truncated bits are all "0"s, the truncated coefficient appears to the multiplier as having a comparatively larger magnitude than the actual magnitude of the coefficient.

Figure 3:
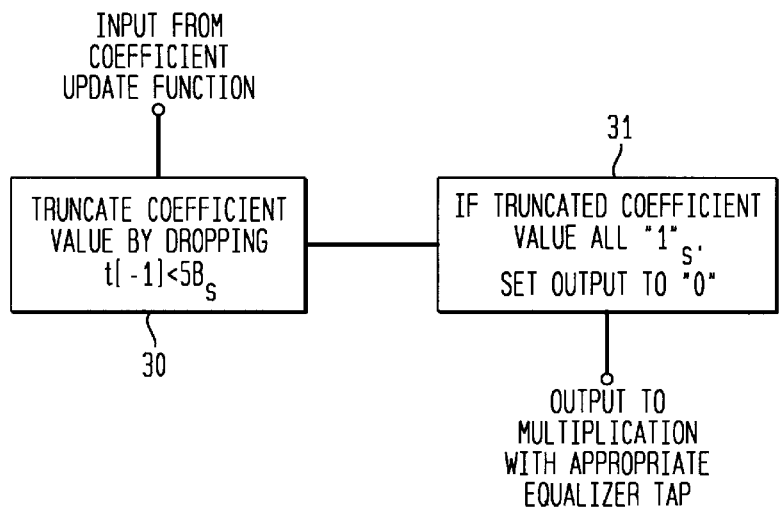
FIG. 3 depicts a screening function for small coefficient values according to the method of the invention.

Accordingly, to eliminate both small positive and small negative coefficients, the application of the "ghost" threshold in conjunction with the bit truncation function requires a supplemental operation. With that operation, the process of the invention (except for the step of choosing a "ghost" threshold) is depicted schematically in FIG. 3. As shown in the figure, an updated coefficient is first operated on by a bit truncation function 30 which causes the t least significant bits to be dropped. That truncated coefficient is then sent to a decision function 31 which looks to see if the bit representation of the truncated coefficient is all "1"s (representing a small number in two's complement), and if so, operates to reset the value of the coefficient to zero. The reset coefficient value (or the original truncated value if not all "1"s) is then sent forward to the equalizer to be multiplied with the value of the input tap corresponding to that coefficient.

Figure 4:
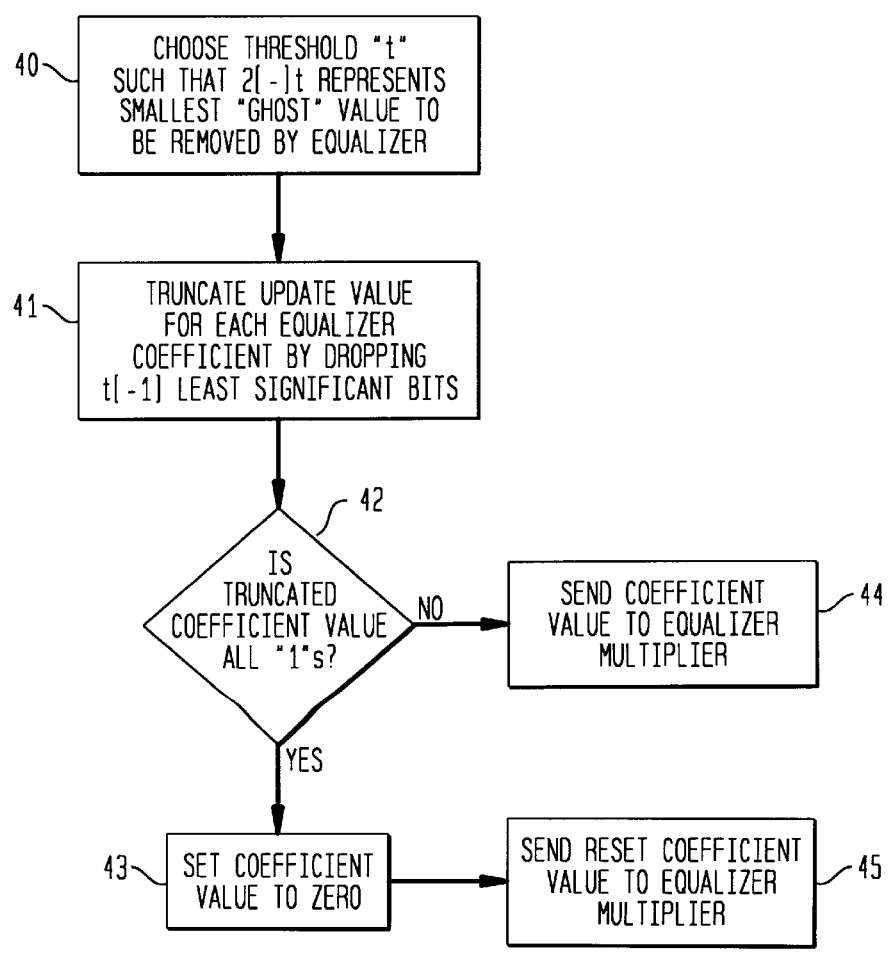
FIG. 4 shows the overall method of the invention in flow chart form.

The overall operation of the method of the invention is illustrated in flow chart form in FIG. 4. As shown in that figure, the process of the invention begins with choosing a threshold t such that $2^t$ represents the magnitude of the smallest "ghost" to be removed by the equalizer (step 40). Next, that threshold is applied for truncation of an updated equalizer coefficient so as to drop the t least significant bits of the coefficient value (step 41). As explained before, for small positive coefficients, this truncation step will have the effect of setting the coefficient value to zero. However, to deal with the occurrence of small negative coefficient values, an additional step is needed to look for such values in two's-complement representation, which, after truncation, will appear as all "1"s. Accordingly, step 42 looks at the truncated coefficient value to see if it is composed of all "1"s. If the answer is yes, an additional step is triggered to reset the coefficient value to zero (step 43). Either that reset coefficient value, or the original truncated coefficient value (in the case of some bits not being "1"s) is then sent to the multiplication function in the equalizer for that coefficient.

CONCLUSION

A methodology for eliminating the effect of very small valued coefficients on an equalizer output has been disclosed and described herein. Because such small coefficients do not usually represent an actual transmission path anomaly for the equalizer to correct, they appear at the equalizer output as noise. Thus, an elimination of the effect of such small coefficients will result in an improvement in the signal to noise factor of the equalizer output. Equally important, such small coefficient values tend to change signs (i.e., plus to minus and vice versa) rapidly, which has the effect of rapidly cycling various gates in the equalizer. This not only adds to the processing overhead of the equalizer, but results in a great deal of unwanted power consumption and dissipation for the equalizer components. Accordingly, a significant reduction in such power dissipation, as will be provided by the method of the invention, will increase the useful lives of many of the equalizer components and, as well, avoid the use of much protective equipment, such as heat sinks, presently employed to minimize the adverse effects of such excess power dissipation.

Although the present embodiment of the invention has been described in detail, it should be understood that various changes, alterations and substitutions can be made therein without departing from the spirit and scope of the invention as defined by the appended claims.

I claim:

1. A method for improving performance of an adaptive equalizer comprising the steps of:
   evaluating at least a portion of a plurality of coefficients corresponding to operation of said equalizer against a threshold, said threshold corresponding to a magnitude of an anomaly in a transmission medium operated on by said equalizer below which no action by said equalizer is desired; and
   truncating an evaluated coefficient so as to drop a number of less significant bits in said coefficient having a value proportional to said threshold.

2. The method of claim 1 further comprising the step of establishing said threshold.

3. The method of claim 1 wherein said threshold is determined as a power of two.

4. The method of claim 1 wherein said value of said predetermined number of dropped less significant bits is equal to said threshold.

5. The method of claim 1 including a further step of recognizing a truncated coefficient having a negative value.

6. The method of claim 5 further including a step of recognizing ones of said negative valued truncated coefficients which have a magnitude less than said threshold, and upon said recognition, setting said coefficient value to zero.

7. A processor programmed to carry out the method of claim 1.

8. The processor of claim 7 implemented as a digital signal processor.

9. The processor of claim 7 implemented as a general purpose computer processor.

10. A storage medium configured to include a computer program for carrying out the method of claim 1.

11. A storage medium fabricated to include a set of instructions for carrying out the method of claim 1.

12. An equalizer responsive to a presence of one or more anomalies in a transmission medium, said equalizer being characterized by a plurality of coefficient terms representative of potential anomalies in said transmission medium, said equalizer comprising:
   means for causing said coefficients to be adapted for changes in said transmission medium;
   means for causing an output of said equalizer to be responsive to a value of at least one of said coefficients;

means for establishing a threshold corresponding to a magnitude of a smallest coefficient value indicative of an anomaly to be operated on by said equalizer; and means for evaluating one or more of said coefficients in said plurality of coefficients against said thresholds; and means for causing an evaluated coefficient to be truncated by dropping a number of less significant bits in said coefficient having a value proportional to said threshold.

13. The equalizer of claim 12 wherein said threshold is determined as a power of two.

14. The equalizer of claim 12 wherein said value of said predetermined number of dropped less significant bits is equal to said threshold.

15. The equalizer of claim 12 further including a means for recognizing a truncated coefficient having a negative value.

16. The equalizer of claim 15 further including a means for recognizing ones of said negative valued truncated coefficients which have a magnitude less than said threshold, and upon said recognition, setting said coefficient value to zero.

17. A method for improving performance of an adaptive equalizer comprising the steps of:

evaluating at least a portion of a plurality of coefficients corresponding to operation of said equalizer against a predetermined threshold, said threshold corresponding to a magnitude of an anomaly in a transmission medium operated on by said equalizer below which no action by said equalizer is desired; and truncating an evaluated coefficient so as to drop a number of less significant bits in said coefficient having a value proportional to said threshold.

18. The method of claim 17 including a further step of recognizing a truncated coefficient having a negative value.

19. The method of claim 18 further including a step of recognizing ones of said negative valued truncated coefficients which have a magnitude less than said threshold, and upon said recognition, setting said coefficient value to zero.

* * * * *